US011187682B2

(12) United States Patent
Suchard

(10) Patent No.: US 11,187,682 B2
(45) Date of Patent: Nov. 30, 2021

(54) SYSTEM AND METHOD FOR IDENTIFYING A TYPE OF A SEDIMENT IN AN INTERIOR CAVITY OF A HOLLOW CYLINDRICAL BODY

(71) Applicant: Sentro Technologies USA, LLC, Newport Beach, CA (US)

(72) Inventor: Talmor Suchard, Newport Coast, CA (US)

(73) Assignee: Sentro Technologies USA, LLC, Newport Beach, CA (US)

( * ) Notice: Subject to any disclaimer, the term of this patent is extended or adjusted under 35 U.S.C. 154(b) by 202 days.

(21) Appl. No.: 16/521,909

(22) Filed: Jul. 25, 2019

(65) Prior Publication Data
US 2020/0033300 A1    Jan. 30, 2020

Related U.S. Application Data

(60) Provisional application No. 62/703,236, filed on Jul. 25, 2018.

(51) Int. Cl.
*G01N 29/04* (2006.01)
*G01N 29/44* (2006.01)

(52) U.S. Cl.
CPC ....... *G01N 29/4427* (2013.01); *G01N 29/041* (2013.01); *G01N 2291/0289* (2013.01); *G01N 2291/2636* (2013.01)

(58) Field of Classification Search
CPC .. G01N 29/041; G01N 29/4427; G01N 29/07; G01N 2291/0289; G01N 2291/0231; G01N 2291/2636

USPC ........................................................... 73/592
See application file for complete search history.

(56) References Cited

U.S. PATENT DOCUMENTS

| | | | |
|---|---|---|---|
| 10,030,502 B1* | 7/2018 | Singer | G01F 23/0076 |
| 2004/0050165 A1* | 3/2004 | He | G01N 29/07 73/597 |
| 2005/0172697 A1* | 8/2005 | Nozaki | G01N 29/46 73/12.01 |
| 2009/0296527 A1* | 12/2009 | Cuschieri | G01V 1/201 367/134 |
| 2013/0153241 A1* | 6/2013 | Mallinson | E21B 33/06 166/363 |

(Continued)

FOREIGN PATENT DOCUMENTS

| | | | | |
|---|---|---|---|---|
| CN | 103884625 | * | 6/2014 | G01N 9/24 |
| CN | 206756749 | * | 12/2017 | G01N 29/02 |
| KR | 201100772099 | * | 6/2011 | H04L 12/26 |

*Primary Examiner* — Jacques M Saint Surin
(74) *Attorney, Agent, or Firm* — The Roy Gross Law Firm, LLC; Roy Gross

(57) ABSTRACT

Disclosed is a system and a method for identifying sediment in an interior cavity of a hollow cylindrical body. The system may include one or more acoustic sensor coupled to the hollow cylindrical body configured to receive sound waves generated by an object travelling through the hollow cylindrical body and generate acoustic measurements; and one or more processor configured to: receive the acoustic measurements from the one or more acoustic sensor; compare the acoustic measurements with one or more prestored acoustic measurement associated with a type of sediment in the hollow cylindrical body; identify the sediment based on the comparison, and send the identification to a user device.

20 Claims, 9 Drawing Sheets

(56) References Cited

U.S. PATENT DOCUMENTS

2016/0258906 A1* 9/2016 Lennox .................. G01N 29/46
2017/0370898 A1* 12/2017 Radjy .................... G01N 33/38

* cited by examiner

Prior Art

SYSTEM AND METHOD FOR IDENTIFYING A TYPE OF A SEDIMENT IN AN INTERIOR CAVITY OF A HOLLOW CYLINDRICAL BODY

CROSS REFERENCE TO RELATED APPLICATIONS

This application claims the benefit of U.S. Ser. No. 62/703,236, filed on Jul. 25, 2018 and entitled SYSTEM AND METHOD FOR TRACKING A CLEANING PROCESS OF A PIPE INTERIOR BASED ON SOUND RECOGNITION, which is incorporated in its entirety herein by reference.

FIELD OF THE INVENTION

The present technology relates to systems and processes for performing maintenance, cleaning, decontamination, descaling, decoking, detecting cracks, detecting holes, detecting deformations, inspection, surveys, testing, and/or other processes in hollow cylindrical bodies (e.g., pipes, tubes and/or pipeline). In particular, the present technology relates to systems and processes for identifying a sediment in an interior cavity of a hollow cylindrical body.

BACKGROUND OF THE INVENTION

One way to enhance performance of flow through hollow cylindrical bodies (e.g., furnace pipes, oil refinery pipes, piping, pipeline, tubes, etc.) is to keep their thermal efficiency high, and/or keep a cross section of a flow area within the cylindrical member unobstructed at its original size over time. During use, however, material can build up within the interior of hollow cylindrical bodies. The material can build up along a segment or entire length of the hollow cylindrical body, at one or more discrete locations within the hollow cylindrical body, or any combination thereof. The cross-sectional area of the passageway in the hollow cylindrical body can vary over the length of the hollow cylindrical body due to the material buildup. The material buildup can restrict the rate of fluid (e.g., liquid or gas) flow across the hollow cylindrical body. For example, pipes and/or tubes within furnaces, heaters and/or boilers can have matter (e.g., sediment) build up on the interior of the pipes and/or tubes caused by, for example, generation of hard deposits of carbon (coke) or polymers in crude oil refining heaters, generation of carbonates (such as: sodium carbonate, calcium carbonate and others), or oxidized metals (such as: iron oxide, copper oxide, and others) in steam boilers. Therefore, it can be desirable to detect and remove build-up from the interior of hollow cylindrical bodies.

Currently, decoking and/or descaling of interior surfaces of pipes and/or tubes in furnaces, heaters and/or boilers are commonly performed. These cleaning processes aim to maintain a flow area and/or a heat or mass transfer at a designed and/or optimal range for the device.

Current systems and methods for maintaining cross-sectional area of hollow cylindrical bodies can include propelling an object (sometimes referred to as a "pig") through the hollow cylindrical body (sometimes referred to as "pigging"). For some systems and devices, pigging can allow maintenance of the hollow cylindrical body in a system and/or device without having to shut down the system and/or device or cut the hollow cylindrical bodies to reach the affected area. Pigging may be used not only for cleaning, but also for inspection of an interior of hollow cylindrical bodies (for example, to detect cracks, wall loss, holes, deformation and/or active leaks).

Current systems and method for pigging can include an object (e.g., the pig) having sharp hardened metal appendages, brushes (e.g., metal and/or plastic), and a cross section similar to a cross section of flow area within the hollow cylindrical body (e.g., slightly smaller than the interior cross section of the hollow cylindrical body). The object is typically inserted into a launcher that is coupled to the hollow cylindrical body. The object can be propelled into and caused to move through the hollow cylindrical body by pressure created by fluid flow (e.g., water and/or product of the system) into the hollow cylindrical body. While flowing through the hollow cylindrical body, the appendages and/or brushes can collide with the build-up inside the hollow cylindrical body, thus causing the build-up to break free from the interior of the hollow cylindrical body and flow through the pipe. At the end of its travel through the hollow cylindrical body, the object can flow into a receiver (sometimes referred to as a "trap," "catcher" or "receiving station").

During operation, the pressure of the fluid can be measured to estimate location(s) of variance of the interior cross-sectional area of the hollow cylindrical body from the expected cross-sectional area. When the object slows down due to a resistance or a restriction, the pressure of the fluid can increase, thus providing some indication of the location along the hollow cylindrical body of the variance (e.g., sediment build up which causes the cross-sectional area within the hollow cylindrical body to be smaller than the expected cross-sectional area).

Some current systems record fluid pressure inside of the hollow cylindrical body to, for example, monitor the pigging cleaning process and avoid underuse or overuse of pigs. Monitoring and/or analyzing the pressure and flow rate of the fluid can also indicate an amount of sediments and sediment location along the hollow cylindrical body. However, this method of monitoring the location of the pig or sediment deposits can be inaccurate and thus, for example, the cleaning process may not be optimal.

Inaccuracy in pigging can be due to inaccurate measurement of the pressure or flow rate of the fluid, diameter changes or deformation along the hollow cylindrical body, analog measurement devices having a lack of sensitivity, or any combination thereof. inaccurate correlation between the measurement of the pressure/flow rate of fluid in the hollow cylindrical body and the location of the pig or obstruction. For example, if the flow rate and/or pressure measurements indicate a large amount of sediments, current methods can fail to indicate the exact physical location of the sediments. Current methods can indicate the physical location of the sediments in an error range of 5-20 feet.

Pigs can be used in various fields such as oil, gas, petroleum energetic materials and/or power plants. In many fields, current practices are characterized with overuse of pigs which can cause increased wear to the pipes, tubes, pipelines and pigs. For example, a pig, which has appendages and/or brushes rubbing against an interior of the hollow cylindrical body that does not have any build-up, can collide with the interior of the hollow cylindrical body itself, thereby damaging or wearing down the interior of the hollow cylindrical body over time.

Some examples for prior art systems and pigs (e.g., objects) are illustrated and discussed in FIGS. 1-3.

Reference is made to FIG. 1, which schematically illustrates an example structure of a prior art object 110 adapted to clean and/or monitor the interior cavity of a hollow cylindrical body. Object 110 has appendages 120, and a cross sectional area, circumference or outer dimension 130. Appendages 120 can be a hardened metal, brushes, plastics, or any combination thereof. Outer dimension 130 of object 110 can be sized approximately equal to (e.g., slightly smaller than, the interior dimension of the hollow cylindrical body traversed thereby). Object 110 can thereby move through the hollow cylindrical body with ease in areas where there is no material build-up or deviation of the interior cross-sectional area of the hollow cylindrical body from its expected cross-section but may stall in the presence of obstructions resulting in cleaning at those locations.

Reference is made to FIG. 2, which schematically illustrates a perspective view of a prior art system that includes an object 220 flowing through a hollow cylindrical body 210. Hollow cylindrical body 210 may have a circular, square, polygonal or other shaped cross-sections and may have linear segments, curved and/or bent segments. As will be apparent to one of ordinary skill in the art, the hole depicted in hollow cylindrical body 210 is a visualization to make object 220 visible, not a physical hole in hollow cylindrical body 210.

Reference is made to FIG. 3, which schematically illustrates a prior art system that includes object 220 flowing through a hollow cylindrical body 210 during a cleaning and/or monitoring process. The prior are system can include a first launcher/receiver 310a that can be coupled to a first end of hollow cylindrical body 210 and a second launcher/receiver 310b that can be coupled to a second end of the hollow cylindrical body. The first launcher/receiver 310a and/or the second launcher/receiver 310b can have diameters that are larger than the diameter of the first end and the second end of the hollow cylindrical body 210, respectively. The first launcher/receiver 310a and/or the second launcher/receiver 310b can be coupled to a high-pressure water supply that can be used to push the object 220 along hollow cylindrical body 210.

Object 220 can be launched by first launcher/receiver 310a and received by the second launcher/receiver 310b, or vice-versa. Each of the first second launcher/receivers 310a and 310b can operate either as the launcher or the receiver or both. For example, if the object 220 is launched from first launcher/receiver 310a, and then gets stuck, object 220 can be flowed back to first launcher/receiver 310a. The same can be true for second launcher/receiver 310b. In various embodiments, first and/or second launcher/receivers 310a and 310b are coupled to any location along the hollow conduit body 210 into which it is desired to insert object 220. In various embodiments, there is an additional one or more lengths of hollow cylindrical body 210 attached to an additional one or more launcher/receivers, for example, extending beyond the location of first and/or second launcher/receivers 310a and 310b such that the first and/or second launcher/receivers 310a and/or 310b are sandwiched between two ends of hollow cylindrical body 210.

In the example depicted in FIG. 3, during operation, object 220 is launched within hollow cylindrical body 210 via a launcher/receiver 310a or 310b and propelled through hollow cylindrical body 210 via fluid pressure applied by launcher/receiver 310a or 310b. The fluid can be water, cleaning solution, process liquid, or other fluid, as is known in the art. When object 220 encounters sediment (e.g., in the case of a furnace, a substance that is typically referred to as "coke"), the object 220 can collide with the sediment, causing the sediment to break down, and exit the hollow cylindrical body 210. In some embodiments, multiple objects are launched into a hollow cylindrical body.

However, any one of the system discussed herein above lacks the ability to identify the sediment and its accurate location in the hollow cylindrical body. Accordingly, there is a longstanding need in the art to provide accurate indications and locations of variances in the interior cross-sectional area of hollow cylindrical bodies, for example, associated with an obstruction or foreign object to target for cleaning. It can also be desirable to diagnose a reason for the accumulation of sediments in specific locations, which can be related to efficiency rate and operational conditions of equipment that employs the hollow cylindrical body.

SUMMARY OF THE INVENTION

Some aspects of the invention may be related to a system for identifying sediment in an interior cavity of a hollow cylindrical body. The system may include one or more acoustic sensor coupled to the hollow cylindrical body configured to receive sound waves generated by an object travelling through the hollow cylindrical body and generate acoustic measurements; and one or more processor configured to: receive the acoustic measurements from the one or more acoustic sensors; compare the acoustic measurements with one or more prestored acoustic measurement associated with a type of sediment in the hollow cylindrical body; identify the sediment based on the comparison, and send the identification to a user device.

In some embodiments, the one or more processor may further be configured to: determine a location of the identified sediment in the hollow cylindrical body; and present the location on the user devise. In some embodiments, the location is determined based on at least one of: additional prestored acoustic measurements associated with locations in the hollow cylindrical body; and the speed of sound, location of a sensor that received the sound, and the time that the sound was received.

In some embodiments, the one or more prestored acoustic measurement may be associated with at least one of: an amount of sediment material deposited, a cross-section of a deposited area, a density of a sediment and a deposited material type. In some embodiments, the additional prestored acoustic measurements are associated with: travelling of an object, stopping of an object, travel speed of an object and a location in the hollow cylindrical body.

In some embodiments, the object has one or more protrusions and at least one cross-section that is smaller than an expected cross-section of the interior of the hollow cylindrical body to allow the object to travel through the hollow cylindrical body; a launcher coupled to a first end of the hollow cylindrical body to launch the object into the hollow cylindrical body; and a receiver coupled to a second end of the hollow cylindrical body to receive the object after it travels through the hollow cylindrical body.

In some embodiments, the one or more processor may be configured to generate a map displaying a visual indication of the one or more sediments layout within the hollow cylindrical body. In some embodiments, the one or more acoustic sensor may be selected from the group consisting of: audible acoustic sensors, ultrasonic sensors, and infrasonic sensors. In some embodiments, the hollow cylindrical body may include one or more pipes, tubes, piping, or pipelines. In some embodiments, the hollow cylindrical body may be composed of metal, composite material, concrete, ceramics, polymers or any combination thereof.

Some additional aspects of the invention may be directed to a method identifying a sediment in an interior cavity of a hollow cylindrical body. The method may include: receiving acoustic measurements from one or more acoustic sensor coupled to the hollow cylindrical body, wherein the acoustic measurements are measurements of sounds waves generated by an object travelling through the hollow cylindrical body; comparing the acoustic measurements with one or more prestored acoustic measurements associated with a type of sediment in the hollow cylindrical body; and identifying the sediment based on the comparison.

In some embodiments, the method further include sending the identification to a user device. In some embodiments, the method further include: determining a location of the identified sediment in the hollow cylindrical body; and presenting the location on the user devise. In some embodiments, the location may be determined based on at least one of: additional prestored acoustic measurements associated with locations in the hollow cylindrical body; and the speed of sound, location of a sensor that received the sound, and the time that the sound was received.

In some embodiments, the one or more prestored acoustic measurement may be associated with at least one of: an amount of sediment material deposited, a cross-section of a deposited area, a density of a sediment and a deposited material type. In some embodiments, the additional prestored acoustic measurements may be associated with travel of a particular object, stopping of a particular object, travel speed of a particular object and a particular location in the hollow cylindrical body.

In some embodiments, the method may further include generating a map displaying a visual indication of one or more sediments layout within the hollow cylindrical body. In some embodiments, the one or more acoustic sensor may be selected from the group consisting of: audible acoustic sensors, ultrasonic sensors, and infrasonic sensors. In some embodiments, the hollow cylindrical body may include one or more pipes, tubes, piping, or pipelines. In some embodiments, the hollow cylindrical body may composed of metal, composite material, concrete, ceramics, polymers or any combination thereof.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
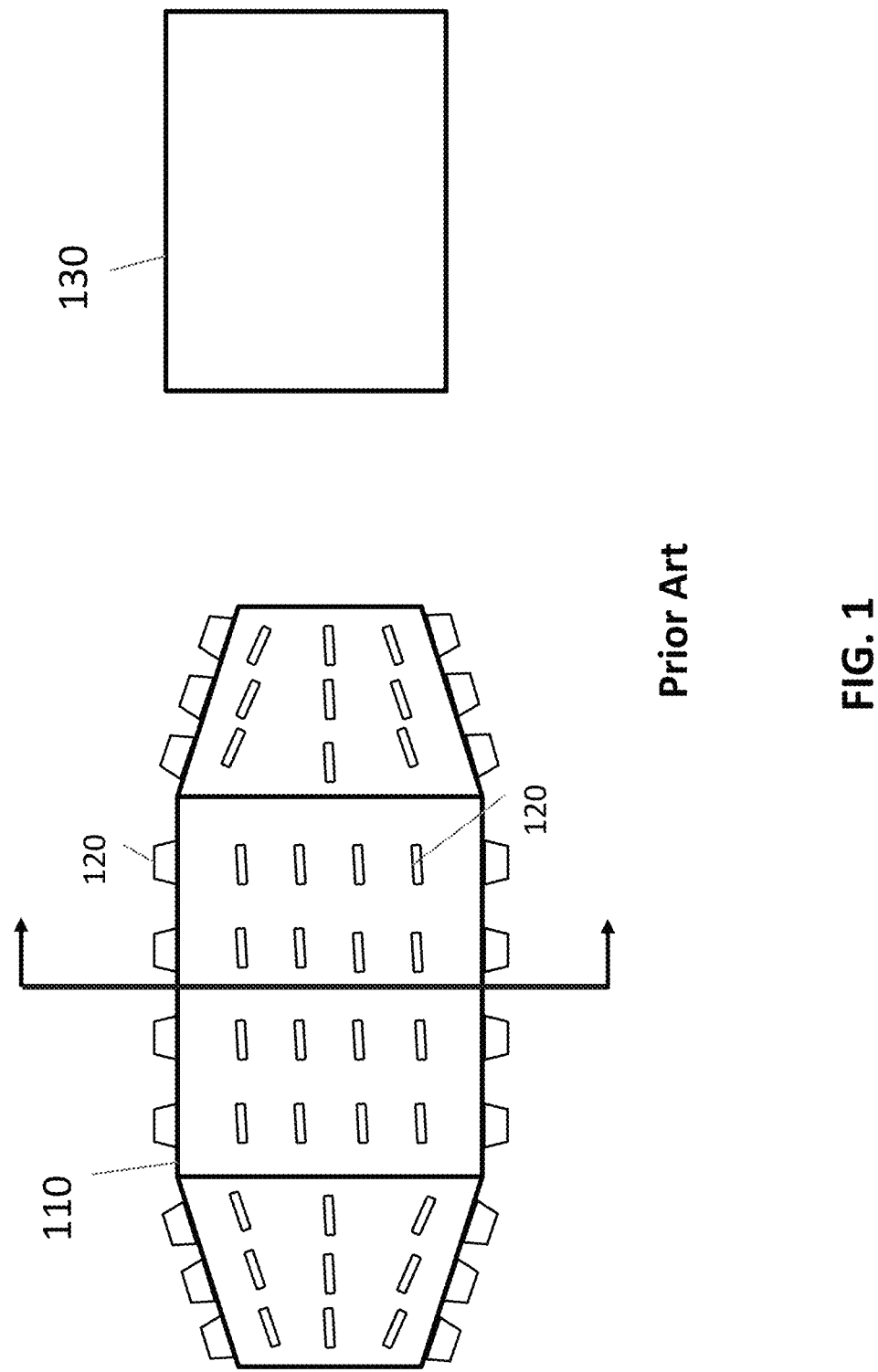
FIG. 1 is an illustration of a prior art object adapted to clean and/or monitor the interior cavity of a hollow cylindrical body, as known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Aspects of the invention may be directed to a system and method for identifying sediments in an interior cavity of a hollow cylindrical body, such as, pipes, tubes, piping, pipelines and the like. In some embodiments, the system and method may further identify the location of each sediment in the interior cavity. Such a hollow cylindrical body may be a furnace pipe, oil refinery pipe, steam boiler pipe and the like.

Accordingly, identifying the type and location of sediments in such pipes may allow improvement in the operation (e.g., heat provision, heat distribution, and the like) in a furnace and/or oil refinery.

In some embodiments, the identification may be conducted by receiving sound waves (measurements) generated by an object (e.g., a pig) that may collide with the sediment. The sound generated during the collision may depend on the type of sediment and optionally also the location of the sediment. For example, collision of similar pigs travelling at similar pipes with sediments from cokes having different densities may generate different sounds. These sounds may be recorded and identified. In another example, collision of similar pigs travelling at similar pipes with sediments having different distribution across the pipe's cross-section (e.g., a sediment accumulated over the entire cross-section and a sediment accumulated on a portion of the cross-section) may also generate different sounds. In some embodiments, the sound may be received (e.g., detected) by any known sensor, as disclosed herein below.

As used herein a sediment according to embodiments of the invention may include any debris, obstacle, fragment that may accumulate of the inner walls of the hollow cylindrical body. The sediment may include any material buildup, in any form, amount, shape, density and material type. In some embodiments, the sediment may change the cross-sectional of an accumulate area in the pipe, narrowing the cross-section or even obstructing the passageway in the pipe. In some embodiments, the sediments may accumulate evenly on an entire cross-section area of a pipe or may form a discrete sediment on a portion of the cross-section area. In some embodiments, a sediment may be accumulated along several centimeter of the hollow cylindrical body. A sediment according to embodiments of the invention may include the following materials: carbon (e.g., coke) or polymers that may accumulate in crude oil refining heaters, carbonates (such as sodium carbonate, calcium carbonate and others) that may accumulate in chemical reactors, oxidized metals (such as iron oxide, copper oxide, and others) that may accumulate in steam boilers and the like.

Figure 2:
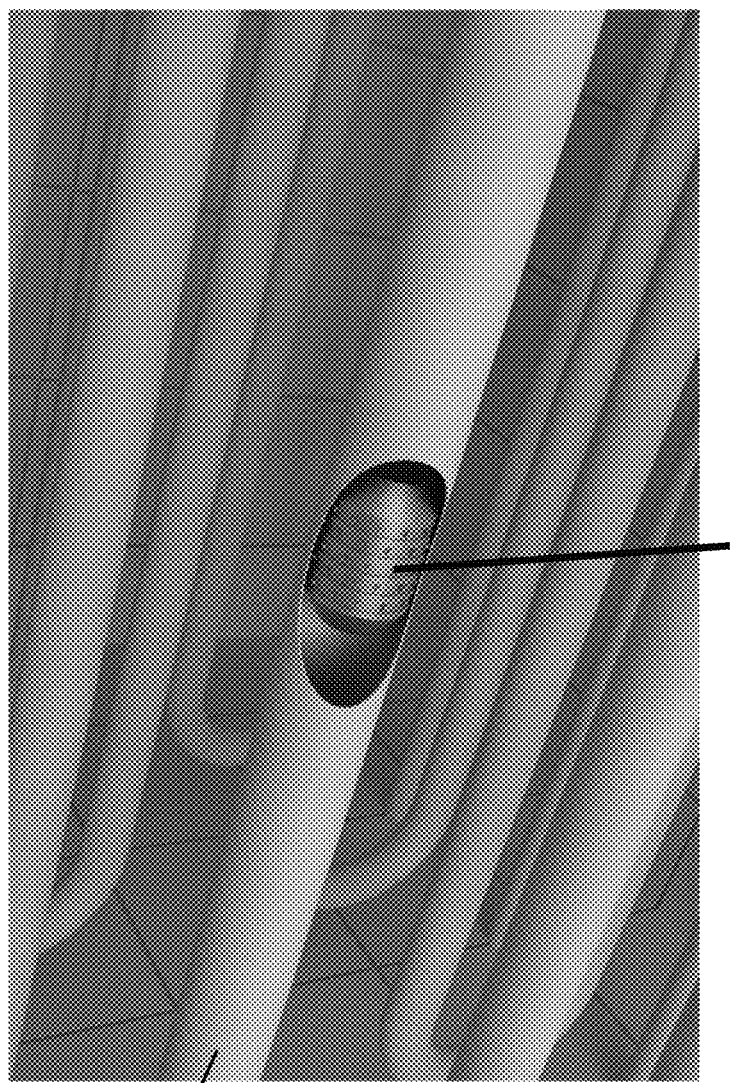
FIG. 2 is an illustration of a perspective view of a prior art system that includes an object flowing through a hollow cylindrical body, as known in the art.
Figure 3:
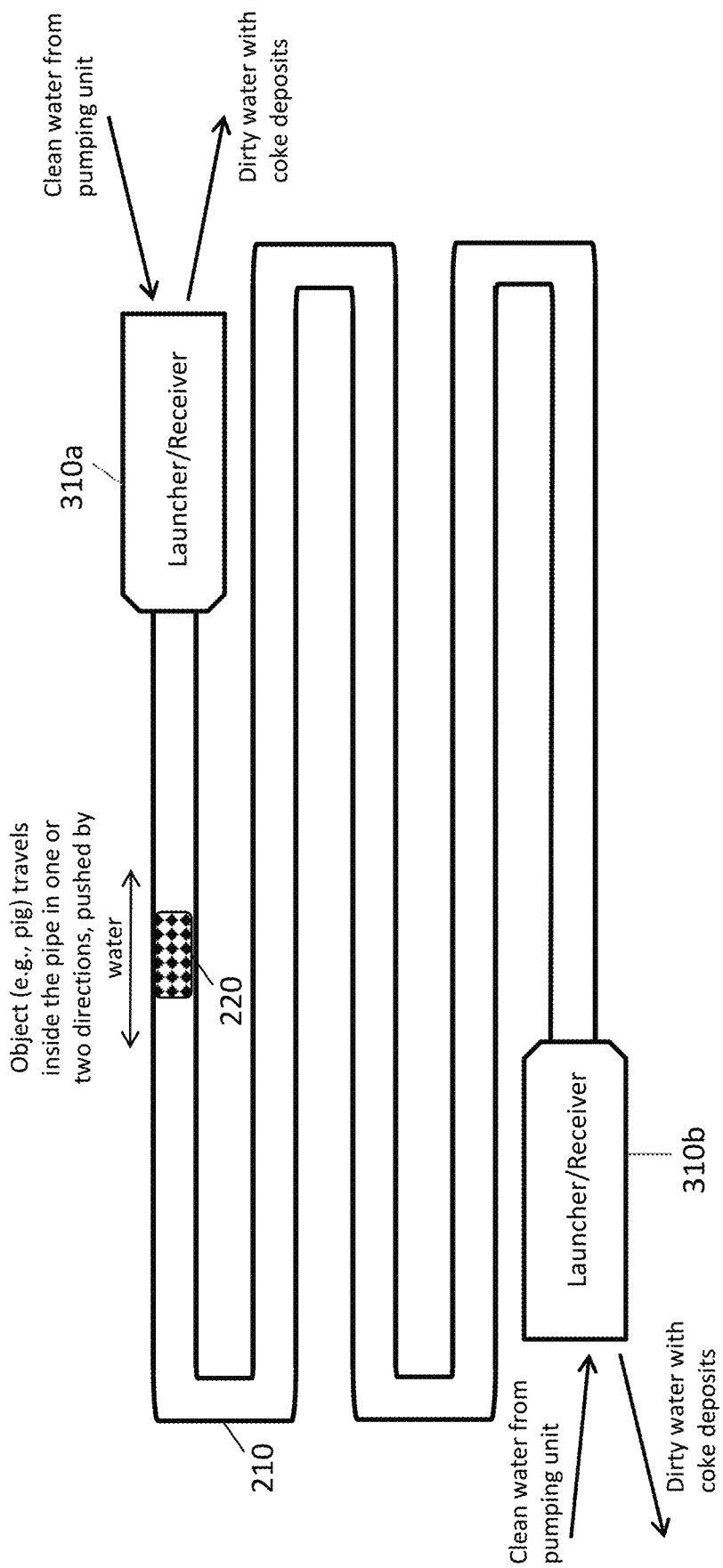
FIG. 3 is an illustration of a prior art system that includes an object flowing through a hollow cylindrical body, as known in the art.
Figure 4:
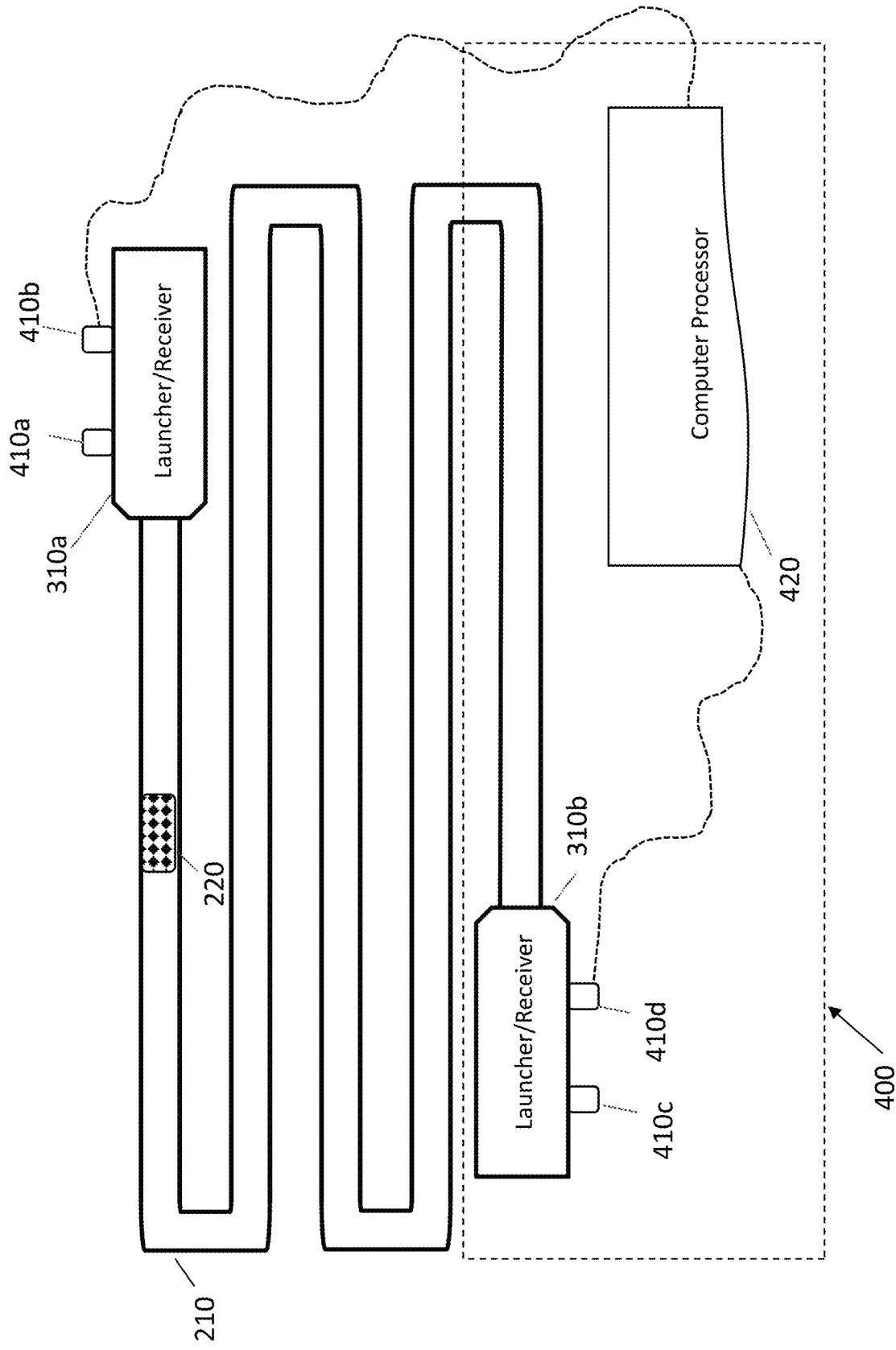
FIG. 4 is an illustration of system for identifying a sediment in an interior cavity of a hollow cylindrical body according to some embodiments of the invention.

Reference is now made to FIG. 4 which is an illustration of system for identifying a sediment in an interior cavity of a hollow cylindrical body according to some embodiments of the invention. A system 400 may be assembled in any hollow cylindrical body or any prior art system that includes hollow cylindrical body, an object (e.g., pig) and at least one launcher/receiver, as illustrated and discussed with respect to FIGS. 2 and 3. System 400 may be configured to detect and analyze sounds made from an object, such as, object 220 when launched from launcher 310a or 310b, while traveling in hollow cylindrical body 210. In some embodiments, object 210 may be launched from launcher 310a using high pressure water (or any other liquid) and may be received in receiver 310b, or vice versa.

In some embodiments, system 400 may include one or more acoustic sensors 410a, 410b, 410c and/or 410d coupled to hollow cylindrical body 210 and configured to receive acoustic measurements of sound waves generated by object 220 travelling through hollow cylindrical body 210. System 400 may further include one or more processors 420 that may be configured to: receive the acoustic measurements from one or more acoustic sensors; 410a, 410b, 410c and/or 410d; compare the acoustic measurements with one or more prestored acoustic measurements associated with a type of sediment in hollow cylindrical body 210; and identify the sediment based on the comparison. In some embodiments, one or more processors 420 may send the identification to a user device associated with at least one of one or more processors 420. The user device may include any UMI element configured to display/present data to a user, such as, screen, touchscreen, loudspeakers, printer and the like.

In the example illustrated in FIG. 4, one or more sensors, 410a, 410b and 410c, 410d are coupled to launcher/receivers 310a and 310b respectively, however at least some of sensors, 410a, 410b and 410c, 410d may be coupled directly to hollow cylindrical body 210. Sensors 410 may be sound or acoustic sensors capable of detecting sound and/or acoustic waves in the audible frequency range, ultrasonic frequency range, and/or infrasonic frequency range. Sensors 410 may be wired and/or wirelessly connected to launcher/receivers 310a and 310b, object 220, and/or a computer processor 420. In various embodiments, there may be any number of sensors 410 located at launcher/receivers 310a and 310b and/or along the length of the hollow cylindrical body 210. The measurements sensed and recorded by sensors 410 may be transmitted from sensors 410 to one or more processors 420 via a wired connection (as shown), or a wireless connection (not shown). In some embodiments, launcher/receivers 310a, 310b may further include one or more pressure sensors to detect pressure or flow in addition to acoustic signals.

In some embodiments, one or more processor 420 may each include a processing unit that may include a processor that may be, for example, a central processing unit (CPU), a chip or any suitable computing or computational device, an operating system and a memory. One or more processor 420 may be included in a desktop computer, laptop commuter, a tablet, a smartphone, a mainframe computer or the like. One or more processor 420 may be configured to carry out methods according to embodiments of the present invention (e.g., the method of FIG. 6) by for example executing instructions stored in the memory.

Figure 7:
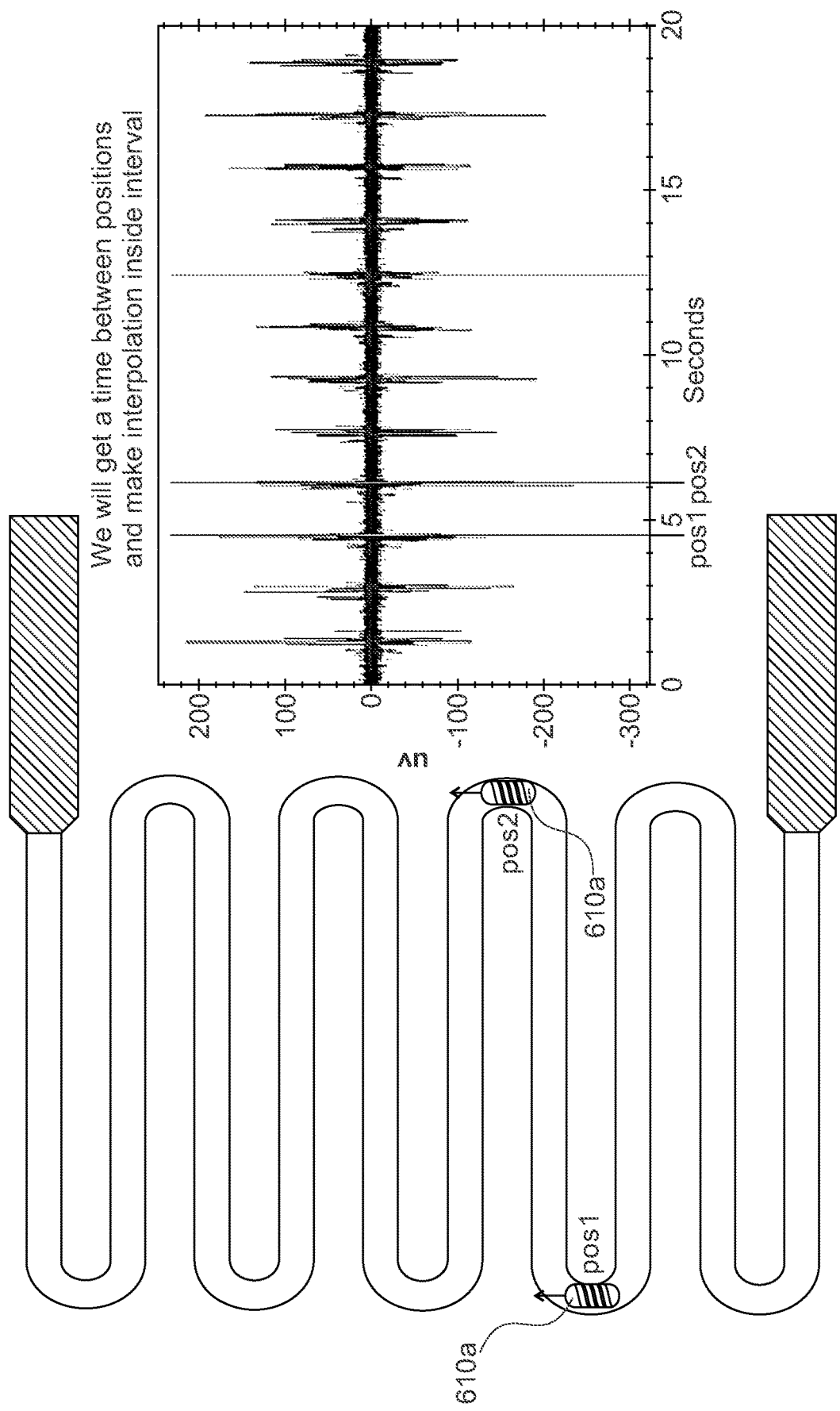
FIG. 7 in an illustration of recorded sound measurements received from the illustrated system according to some embodiments of the invention.

In some embodiments, processor 420 may receive the sensed measurements and process/analyze the sensed measurement to determine at least one of: a type of a sediment and a location of the sediment within an interior cross-section of the hollow cylindrical body. Absent an obstruction (e.g., sediment), the acoustic signal detected by sensors 410 may have an expected or signature wave profile associated with unobstructed movement of the object 220 through the hollow cylindrical body 210 (e.g., as shown in FIG. 7). However, when object 220 collides with an obstruction (e.g., a sediment) at a location, the acoustic signal deviates from the expected wave profile, and sensors 410 records an acoustic signal associated with object 220 collision. After the obstruction has been cleaned and removed, the acoustic signal may return to the expected wave profile associated with unobstructed movement of the object 220. The sensed measurement may also be used to sense a location of the object 220 and/or the sediments within the hollow cylindrical body.

In some embodiments, processor 420 may include or be in communication with a database that includes a library of presorted sample acoustic signals associated with a type of sediment in the hollow cylindrical body and/or a location in the hollow cylindrical body. The processor may compare the sensed measurements to a particular presorted acoustic profile or wave profile. For example, the location of an element that generates a sound can be determined based on the speed of sound, location of a sensor that received the sound, and/or the time that the sound was received. The received sound can indicate the type of the sediment. The identification can be based on machine learning technology and a library of sounds, acoustic profile, or wave profile.

In some embodiments, the library may include prestored sound measurements associated with object 220 colliding, travelling and/or stopping in hollow cylindrical body 210. For example, the prestored sound measurements may be associated with an amount of sediment material deposited, the cross-section of a deposited area, a density of a sediment, a deposited material type, or any combination thereof. In some embodiments additional sound measurements may be prestored in the library, for example, sounds measurements associated with travelling of a particular object, stopping of a particular object, travel speed of a particular object, a particular location in the hollow cylindrical body, or any combination thereof. The library of sound samples may be collected over the lifetime of the operation of hollow cylindrical body 210. Sound frequency, pitch or pattern may be used to determine the location of the object 220 and/or sediment type with which the object 220 collides, for example, as discussed in reference to FIGS. 5 and 7.

Figure 5:
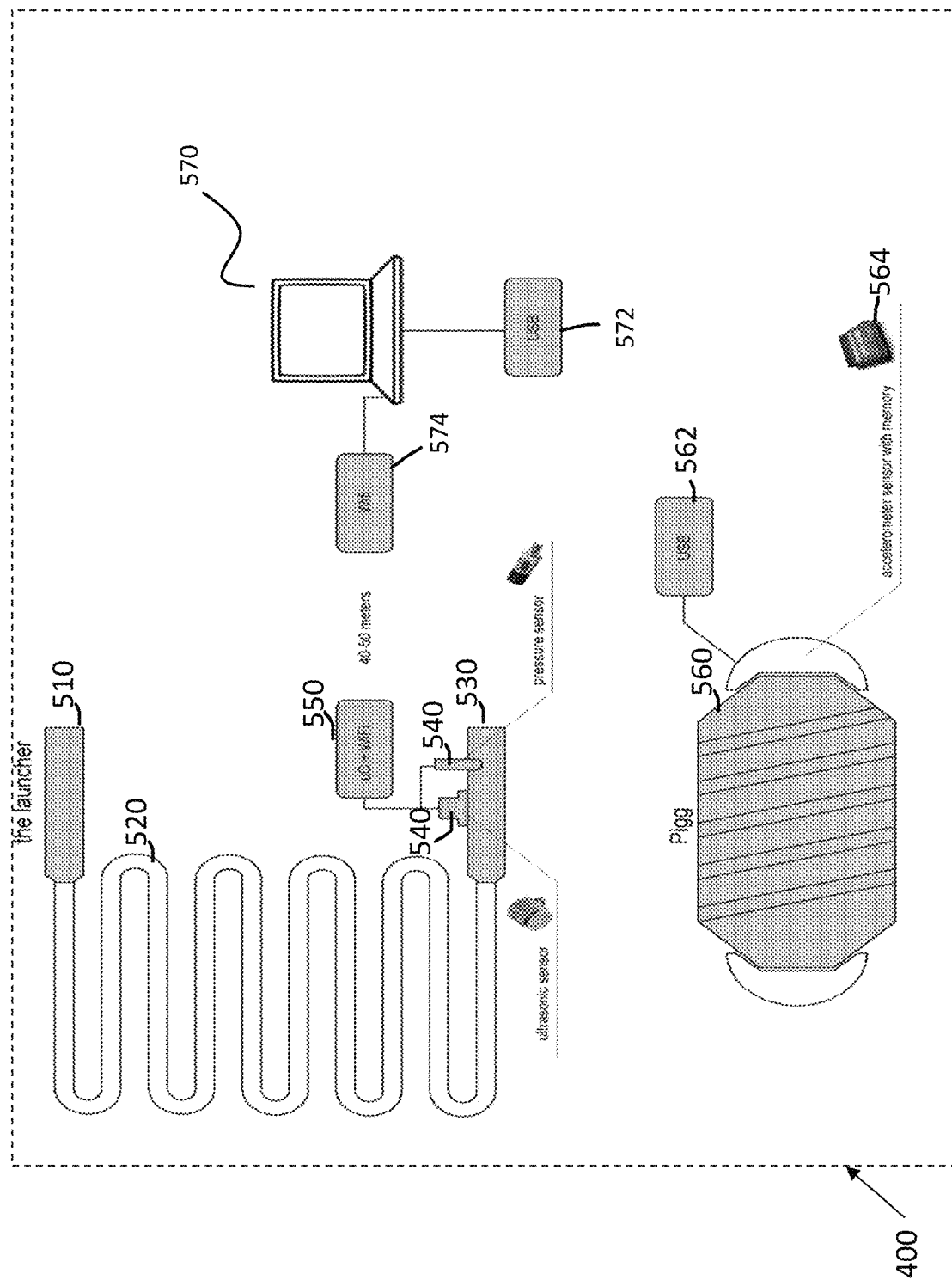
FIG. 5 is an illustration of system for identifying a sediment in an interior cavity of a hollow cylindrical body according to some embodiments of the invention.

Reference is made to FIG. 5 which shows a system for identifying a sediment in an interior cavity of a hollow cylindrical body according to some embodiments of the invention. A system 500 may include a launcher 510, a hollow cylindrical body 520, a receiver 530, one or more sensors 540, a microprocessor and wireless transmitter 550 (e.g., WIFI), an object pig 560, and a computing device 570. Hollow cylindrical body 520 may include one or more: pipes, tubes, piping, and/or pipelines. Hollow cylindrical body 520 may be composed of metal, composite material, concrete, ceramics, polymers or any combination thereof.

Object 560 may include a wired or wireless (e.g., USB) connector 562, and an accelerometer and/or memory unit 564 connected thereto. Computing device 570 may include a wired (e.g., USB) port 572 and/or a wireless (e.g., WIFI) transmitter/receiver 574. During operation, object 560 may be launched from launcher 510 into hollow cylindrical body 520. Object 560 may flow through hollow cylindrical body 520 to receiver 530. While flowing through hollow cylindrical body 520 object 560 may collect (e.g., using accelerometer 564) and transmit data (e.g., movement measurements, speed, distance travelled, time, etc.) to receiver 530 and/or to computing device 570. Object 560 may store the collected data in memory unit 564 such that the collected data may be received via the wired or wireless connection 572 and post processed via the computing device 570.

In some embodiments, one or more sensors 540 may include an acoustic sensor configured to record acoustic waves in the audible, ultrasonic and/or infrasonic frequency ranges. One or more sensors 540 may also include a pressure sensor. In some embodiments, sensors 540 and/or accelerometer 564 are wirelessly (e.g., WIFI) enabled (connected to a transmitter) such that the acoustic, pressure and/or accelerometer movement measurements may be transmitted wirelessly, in real-time and/or post processing, for example, to computing device 570.

Figure 6:
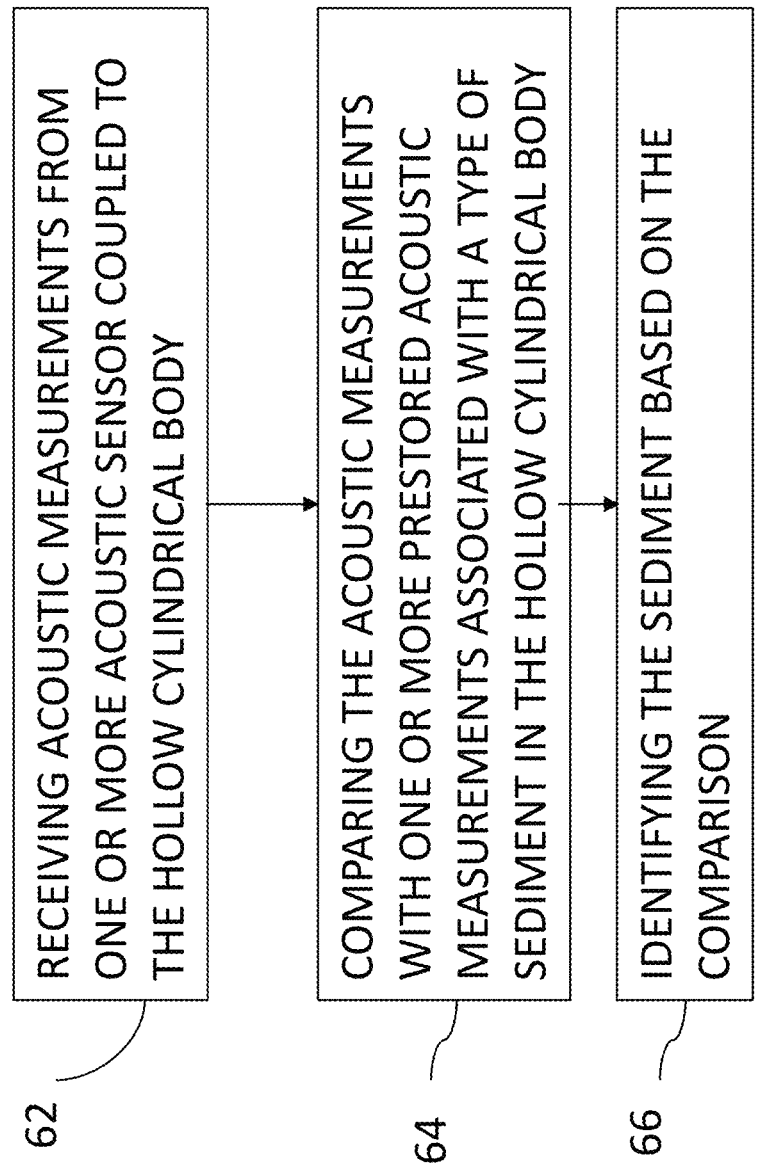
FIG. 6 is a flowchart of a method of identifying a sediment in an interior cavity of a hollow cylindrical body according to some embodiments of the invention.

Reference is now made to FIG. 6 which is a flowchart of a computer implemented method of identifying a sediment in an interior cavity of a hollow cylindrical body according to some embodiments of the invention. The method of FIG. 6 may be performed by any suitable processor, for example, one or more processors 420 and/or computing device 570. In step 62, acoustic measurements may be received from one or more acoustic sensors (e.g., acoustic sensors 410 and/or 540) coupled to the hollow cylindrical body (e.g., hollow cylindrical body 210 and/or 520). In some embodiments, the acoustic measurements are measurements of sounds waves generated by an object (e.g., object 220 and/or 560) travelling through the hollow cylindrical body. In some embodiments, the object may collide with a sediment located in the interior volume of the hollow cylindrical body. The sound produce by the collision may be detected and recorded by the one or more acoustic sensors.

In step 62, the acoustic measurements may be compared with one or more prestored acoustic measurements associated with a type of sediment in the hollow cylindrical body. In some embodiments, one or more processors 420 and/or computing device 570 may be associated with a library that may include prestored measurements of sound waves produced by known objects travelling in known hollow cylindrical bodies. In some embodiments, the prestored sound measurements may include one or more of: frequency, amplitude pitch or pattern of a recorded sound wave. Accordingly, one or more processors 420 and/or computing device 570 may compare one or more of: frequency, amplitude pitch or pattern of the received acoustic measurements with one or more of: frequency, amplitude pitch or pattern of the prestored acoustic measurements.

In some embodiments, the sound produce by the collision may depends from a variety of parameters, for example, depends on the type of object and type of hollow cylindrical body, for example, the material from which the object and/or the hollow cylindrical body are made, the size of the cross section of the hollow cylindrical body, the number of bends (e.g., knees, U turns, etc.) in the hollow cylindrical body and the like. The collision sounds may further depend on the type of sediment, for example, the material (e.g., coke, polymers, oxides, etc.), the density of the sediment, the distribution of the sediment (e.g., full cover of the cross section, partial cover of the cross section, etc.) and the like. The collision sounds may further depend on the speed at which the object is travelling in the hollow cylindrical body.

In some embodiments, the prestored acoustic measurements may each be associated with a type of sediment. In some embodiments, the one or more prestored acoustic measurements may be associated with at least one of: an amount of sediment material deposited, cross-section of a deposited area, a density of a sediment and a deposited material type, as disclosed herein above. For example, the library may include acoustic measurements of an iron pig traveling in a concreate pipe and colliding with various types of sediments having different densities. In some embodiments, the denser the sediment the louder are the sound waves generated by the collision, as discussed with respect to the graphs in FIGS. 8A-8C, herein below. In yet another example, the library may include acoustic measurements of an iron pig traveling in a an iron furnace pipe and colliding with various types of coke sediments having different distributions on the surface of the interior wall of the pipes, as discussed with respect to the graphs in FIGS. 9A-9C, herein below.

In step 66, the sediment may be identified based on the comparison. In some embodiments, one or more processors 420 and/or computing device 570 may find a correlation between the received acoustic measurements and at least one prestored acoustic measurements, thus may identify the sediment in which the object was collide, while generating the measured sound wave, as the sediment associated with the prestored acoustic measurements.

In some embodiments, the method may further include sending the identification to a user device. In some embodiments, one or more processors 420 and/or computing device 570 may send the identification of the sediment to be presented to a user, via a user device.

In some embodiments, the method may further include determining a location of the identified sediment in the hollow cylindrical body and presenting the location on the user device. In some embodiments, the location may be determined based on an additional prestored acoustic measurements associated with locations in the hollow cylindrical body. For example, additional prestored acoustic measurements may be associated with, travelling of a particular object, stopping of a particular object, travel speed of a particular object and a particular location in the hollow cylindrical body and the like. In some embodiments, the location may be determined/calculated based on the speed of sound (e.g., in water), a location of a sensor that received the sound, and the time that the sound was received In some embodiments, the traveling speed of the object can be neglected in comparison to the speed of sound.

In some embodiments, the method may include generating a map displaying a visual indication of one or more sediments layout within the hollow cylindrical body. The map may include information regarding the type and location of each sediment in the hollow cylindrical body. The map may be presented/displayed on a screen included in a user devise associated with one or more processors 420 and/or computing device 570.

In some embodiments, by knowing the sediment type deposited within the interior of the hollow cylindrical body 210, a solution (e.g., heating within a particular temperature range, particular chemicals that interact with the sediment type, etc.) may be applied to further remove the sediment. In some embodiments, by knowing the location of the sediments, those particular areas may be continually monitored, for example, to prevent build up in those locations, controlling the pig to move more slowly in areas known the have more build up, and/or use the information for simulations that may allow experimenting with different hollow cylindrical body sizes, flow rates and/or heating nodes to reduce the build-up. In some embodiments, additional sensors can be placed on the exterior surface of the hollow cylindrical body 210/520 at or near locations known to have more buildup.

Reference is now made to FIG. 7 which is in an illustration of recorded sound measurements received from the illustrated system according to some embodiments of the invention. The system illustrated in FIG. 6 may include an example of an object 610*a* flowing through the hollow cylindrical body, in accordance with an embodiment of the invention. The one or more sensors may record acoustic measurements taken when object 610*a* travels in the hollow cylindrical body, for example, the acoustic measurements presented in the graph of FIG. 6. In some embodiments, one or more processors may calculate/determine the time it takes object 610*a* to reach a particular location within the hollow cylindrical body, for example, the first U bend, based on the acoustic measurements. As shown in the graph of FIG. 6 each time object 610 travels through a U bend the sound wave changes, thus from analyzing the graph of FIG. 6, the processor may conclude that it takes object 610 about 1.5 seconds to travel from one U bend to the other.

Figure 8A:
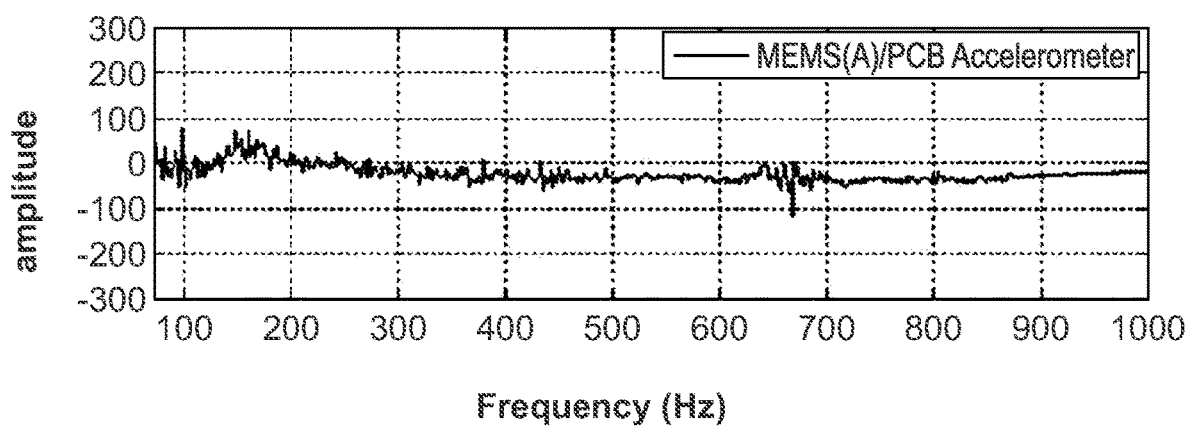
FIGS. 8A-8C show graphs of sound measurements of amplitude vs. frequency, of various types of sediments measured according to some embodiments.
Figure 8B:
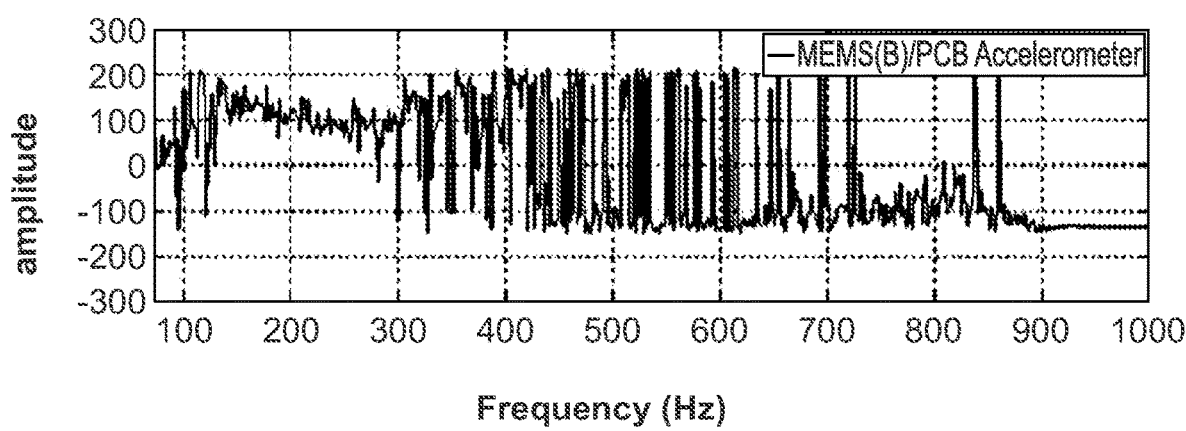
Figure 8C:
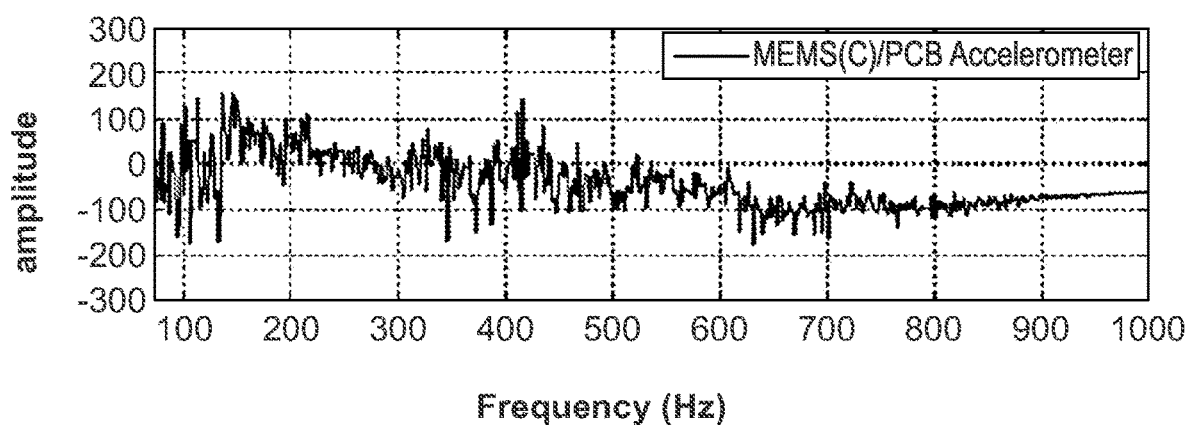

Reference is now made to FIGS. 8A-8C which show graphs of acoustic measurements of amplitude vs. frequency, from various types of sediments measured according to some embodiments of the invention. In FIGS. 8A-8C the amplitude of the recorded sound waves for 3 types of coke sediments ware measured at various frequencies. The higher the amplitude the denser is the coke sediment. Accordingly, the acoustic measurements presented in FIG. 8A were taken from the less dense sediment and the acoustic measurements presented in FIG. 8C were taken from the densest sediment.

Figures 9A, 9B, 9C:
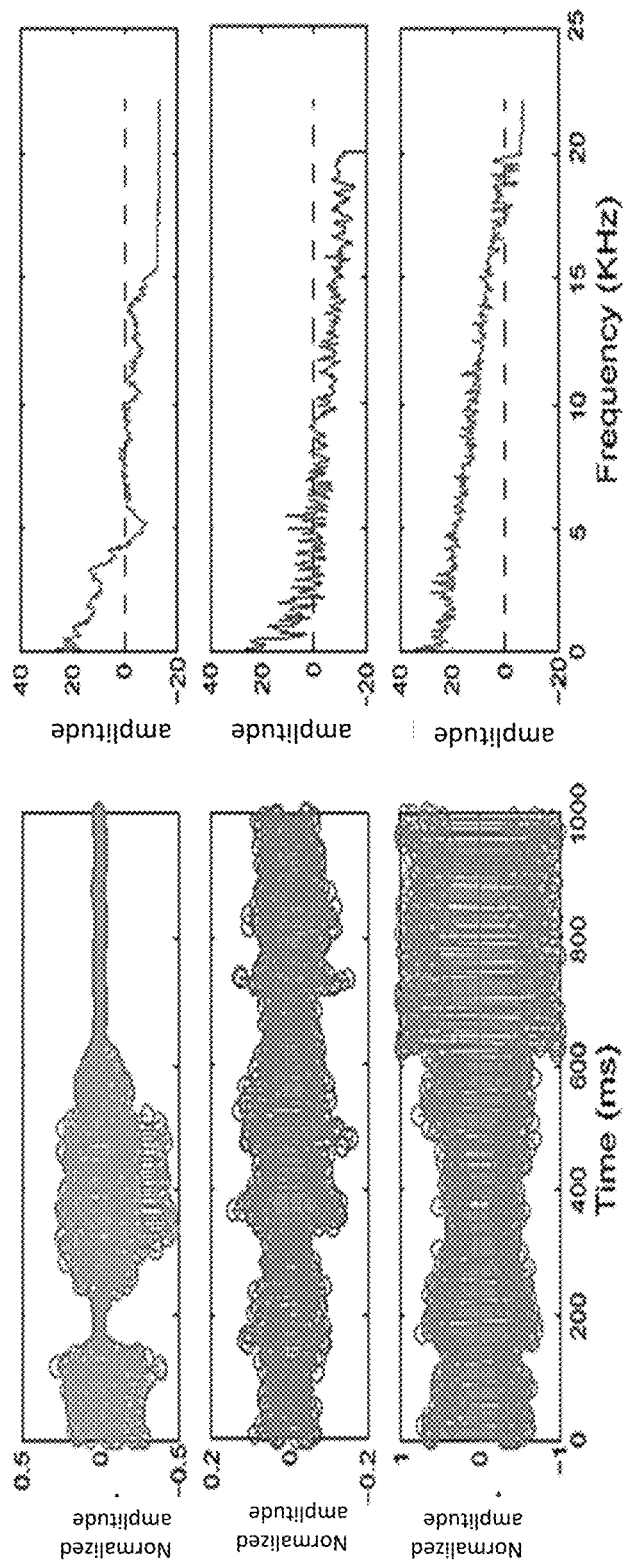
FIGS. 9A-9C show graphs of sound measurements amplitude vs, frequency or time of various types of sediments measured according to some embodiments.

Reference is now made to FIGS. 9A-9C which show graphs of sound measurements of amplitude vs. frequency or time from various types of sediments measured according to some embodiments of the invention. The graphs on the left side present the normalized amplitude as a function of time and the graphs on the right side present the measured amplitude in dB as a function of frequency. The longer and louder the acoustic measurements, the larger the sediment. For example, the graphs of FIG. 9A are of acoustic measurements from a collision of an object with two small and discrete sediments, while the graphs of FIGS. 9B and C depict acoustic measurements from a collision of the object with sediments accumulated around the entire cross section for several centimeters. The graphs of FIG. 9C depict acoustic measurements of an almost complete obstruction of a pipe.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for identifying sediment in an interior cavity of a hollow cylindrical body, the system comprising:
   a launcher coupled to a first end of the hollow cylindrical body to launch a solid traveling object into the hollow cylindrical body;
   one or more acoustic sensors coupled to the hollow cylindrical body configured to receive sound waves generated by the solid traveling object travelling through the hollow cylindrical body, and to generate acoustic measurements; and
   one or more processors configured to:
   receive the acoustic measurements from the one or more acoustic sensors;
   compare the acoustic measurements with one or more prestored acoustic measurements associated with a type of sediment in the hollow cylindrical body;
   identify the sediment based on the comparison, and
   send the identification to a user device.

2. The system of claim 1, wherein the one or more processors are further configured to:
   determine a location of the identified sediment in the hollow cylindrical body; and
   present the location on the user devise.

3. The system of claim 2, wherein the location is determined based on at least one of:
   additional prestored acoustic measurements associated with locations in the hollow cylindrical body; and
   the speed of sound, a location of a sensor that received the sound, and the time that the sound was received.

4. The system of claim 1, wherein the one or more prestored acoustic measurements are associated with at least one of: an amount of sediment material deposited, a cross-section of a deposited area, a density of a sediment and a deposited material type.

5. The system of claim 3, wherein the additional prestored acoustic measurements are associated with: travelling of the solid traveling object, stopping of the solid traveling object, travel speed of the solid traveling object and a location in the hollow cylindrical body.

6. The system of claim 1, wherein:
the solid traveling object has one or more protrusions and at least one cross-section that is smaller than an expected cross-section of the interior of the hollow cylindrical body to allow the object to travel through the hollow cylindrical body,
and wherein the system further comprises a receiver coupled to a second end of the hollow cylindrical body to receive the object after it travels through the hollow cylindrical body.

7. The system of claim 1, wherein the one or more processors are configured to generate a map displaying a visual indication of the one or more sediments layout within the hollow cylindrical body.

8. The system of claim 1 wherein the one or more acoustic sensors are selected from the group consisting of: audible acoustic sensors, ultrasonic sensors, and infrasonic sensors.

9. The system of claim 1 wherein the hollow cylindrical body comprises one or more pipes, tubes, piping, or pipelines.

10. The system of claim 1 wherein the hollow cylindrical body is composed of metal, composite material, concrete, ceramics, polymers or any combination thereof.

11. A method of identifying a sediment in an interior cavity of a hollow cylindrical body, comprising:
launching, from a launcher coupled to a first end of the hollow cylindrical body, a solid traveling object into the hollow cylindrical body;
receiving acoustic measurements from one or more acoustic sensors coupled to the hollow cylindrical body, wherein the acoustic measurements are measurements of sounds waves generated by the solid traveling object travelling through the hollow cylindrical body;
comparing the acoustic measurements with one or more prestored acoustic measurements associated with a type of sediment in the hollow cylindrical body; and
identifying the sediment based on the comparison.

12. The method of claim 11, further comprising: sending the identification to a user device.

13. The method of claim 11, further comprising:
determining a location of the identified sediment in the hollow cylindrical body; and
presenting the location on the user devise.

14. The method of claim 11, wherein the location is determined based on at least one of:
additional prestored acoustic measurements associated with locations in the hollow cylindrical body; and
the speed of sound, a location of a sensor that received the sound, and the time that the sound was received.

15. The method of claim 11, wherein the one or more prestored acoustic measurement are associated with at least one of: an amount of sediment material deposited, a cross-section of a deposited area, a density of a sediment and a deposited material type.

16. The method of claim 14, wherein the additional prestored acoustic measurements are associated with travel of a particular solid traveling object, stopping of a particular solid traveling object, travel speed of a particular solid traveling object and a particular location in the hollow cylindrical body.

17. The method of claim 11, further comprising generating a map displaying a visual indication of one or more sediments layout within the hollow cylindrical body.

18. The method of claim 11, wherein the one or more acoustic sensors are selected from a group consisting of: audible acoustic sensors, ultrasonic sensors, and infrasonic sensors.

19. The method of claim 11, wherein the hollow cylindrical body comprises one or more pipes, tubes, piping, or pipelines.

20. The method of claim 11, wherein the hollow cylindrical body is composed of metal, composite material, concrete, ceramics, polymers or any combination thereof.

* * * * *